United States Patent [19]

Thacker

[11] 3,712,326
[45] Jan. 23, 1973

[54] INFLATION VALVES
[75] Inventor: Stephen E. W. Thacker, Birmingham 24, England
[73] Assignee: Dunlop Holdings, Limited, Birmingham, England
[22] Filed: Sept. 11, 1970
[21] Appl. No.: 71,593

[30] Foreign Application Priority Data

Sept. 23, 1969  Great Britain.....................46,760/69

[52] U.S. Cl. ..............137/223, 177/234.5, 251/368, 137/539, 152/427
[51] Int. Cl.............................................F16k 15/20
[58] Field of Search ...137/223, 234.5, 539; 152/427; 251/368

[56] References Cited

UNITED STATES PATENTS

| 3,509,902 | 5/1970 | Lutz | 137/234.5 |
| 2,106,671 | 1/1938 | Watson | 137/539 X |
| 2,094,264 | 9/1937 | Crowley | 137/223 |
| 2,361,890 | 10/1944 | Watson | 137/223 |
| 2,262,169 | 11/1941 | Crowley | 137/539 X |
| 2,772,714 | 12/1956 | Hoskins | 137/223 X |
| 3,191,655 | 6/1965 | McCord | 152/427 |
| 3,346,233 | 10/1967 | Billson | 251/315 X |
| 3,180,349 | 4/1965 | Steer | 137/223 |
| 3,091,254 | 5/1963 | Kilayko | 251/368 X |

Primary Examiner—Harold W. Weakley
Attorney—Stevens, Davis, Miller & Mosher

[57]         ABSTRACT

An inflation valve for a tubeless tire comprising a valve stem formed with interior projections for location of a valve core, the stem being embedded within a mushroom-shaped rubber body and the whole assembly being capable of being inserted into a valve aperture by hand without the aid of an insertion tool. The stem is preferably moulded from reinforced plastics material, e.g., glass-fiber reinforced nylon.

10 Claims, 4 Drawing Figures

INFLATION VALVES

This invention relates to inflation valves, particularly to valves for use with tubeless pneumatic tires, and it is an object of the present invention to provide an improved form thereof.

According to the invention an inflation valve comprises a valve stem of elongated form having a passage extending therethrough, the passage being formed with a screw-threaded mouth portion adjacent one end of the passage by means of which a valve core may be retained in the passage in sealing engagement with a valve seat formed inwardly of the mouth, a substantial portion of the remainder of the passage being provided with a plurality of projections extending inwardly from a wall of the passage to support the valve core away from the wall and to allow pressurizing fluid having passed through the valve core to flow along the passage between the projections and then out through that end of the stem remote from the mouth portion.

Preferably the stem is provided with an end bush which is an interference fit in the end of the stem remote from the mouth, a shoulder being formed by the bush on which the valve core is locatable. The bush extends inside the valve stem over a part of the passage not provided with projections.

Preferably also, the stem and the bush are formed from mouldable plastics material, e.g., nylon which may be suitably reinforced, e.g., with glass fibers.

In one form of valve according to the invention the valve stem is of tubular form, i.e., of circular cross-section, and the projections comprise longitudinal and radially inwardly extending ribs. The projections, e.g., ribs may be of substantially semi-circular or rectangular cross-section. This shape of valve is readily moulded with a suitably shaped core which may be withdrawn after moulding.

One embodiment of the invention, a valve for a tubeless pneumatic tire, will now be described by way of example only, with reference to the accompanying drawings of which:

Figure 1:
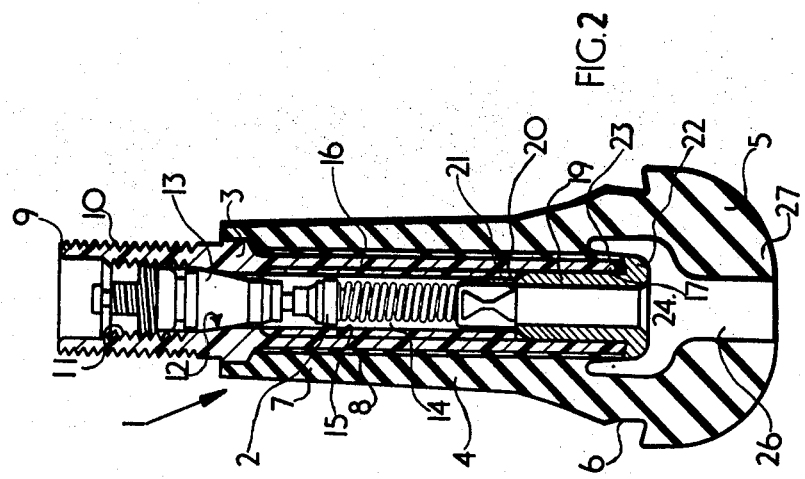
FIG. 1 is a longitudinal cross-sectional drawing of the valve with the valve core close.

The valve 1 comprises a spring-loaded core 2 of known form within a tubular stem 3. The stem is embedded within a mushroom-shaped rubber body 4, the head 5 of the body being capable of fitting, by means of an annular recess 6, within a valve aperture provided in a wheel rim (not shown), so that the stem 7 of the body and the valve stem 3 point generally radially inwardly of the wheel and tire assembly. The exterior surface of the valve stem is provided with depressions in the form of axially extending flutes 8 to increase the bonding area between the stem and the rubber of the mushroom.

The tubular valve stem 3 is moulded from "Maranyl" A190 (glass fiber reinforced nylon made by I.C.I. Limited) and comprises a mouth portion 9, formed with an external screw-threaded portion 10 for the reception of a connector from a pump. The interior of the mouth portion is also screw-threaded for the reception of the core 2, the thread 11 beginning a short distance inwardly from the end of the stem. Inwardly of the screw-threaded portion 11 the passage narrows to a smaller diameter and is formed with a frusto-conical surface 12 to provide a valve seat against which a correspondingly-shaped tapered portion 13 of the valve core seats in sealing engagement when the core is screwed into the stem 2.

A short distance inwardly from the frusto-conical surface 12 the passage widens out to a portion 14 of larger diameter, and this diameter is constant for the remainder of the length of the passage. For a substantial length of this portion, the wall 15 of the passage is formed with six ribs 16 of semi-circular cross-section which extend axially of the stem, the ribs ending a relatively short distance inwardly of that end 17 of the stem further from the mouth. Flutes 18 are formed intermediate of the ribs.

A tubular end bush 19 also of nylon reinforced with glass fibers having an external diameter substantially equal to that of the interior of the stem is an interference fit within the end 17 of the valve stem 3 further from the mouth 9 and is of sufficient length to extend over that portion of the stem wall 15 not provided with ribs 16. The end 20 of the bush 19 thus provides a shoulder immediately adjacent the ends of the ribs 16 against which the end 21 of the valve core 2 seats in abutting relationship. The end bush 19 is provided with a head portion 22 of diameter equal to the external diameter of the stem 3, a shoulder 23 adjacent the head abutting the end 17 of the stem 3.

Figure 2:
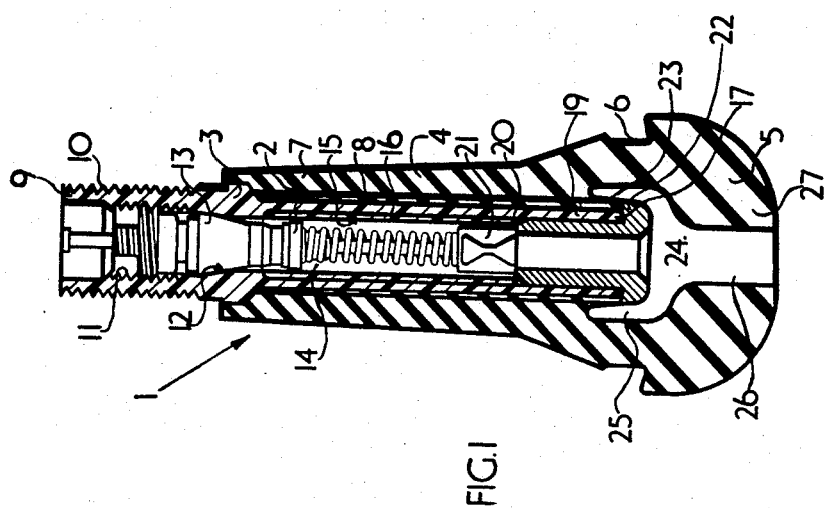
FIG. 2 is a longitudinal cross-sectional drawing of the valve with the valve core open.
Figure 3:
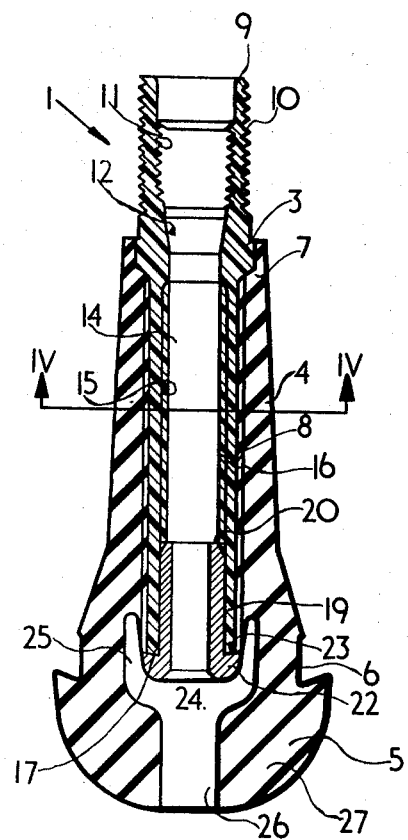
FIG. 3 is a longitudinal cross-sectional drawing of the valve without the valve core.
Figure 4:
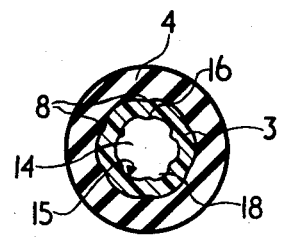
FIG. 4 is a transverse cross-section of the valve without the valve core taken on the line IV—IV of FIG. 3.

As shown in FIGS. 1, 2 and 3 the end 17 of the stem 3 remote from the mouth portion thereof and the head 22 of the end bush 19 extend into an interior chamber 24 formed within the rubber body. The chamber is of circular cross-section having a portion 25 of enlarged diameter into which the stem and end bush extend and a relatively smaller diameter portion 26 which leads through the head 27 of the rubber body and into the space formed between the wheel and tire. It is thus of generally Y-shaped cross-section. The portion 25 of enlarged diameter of the chamber, the bead 22 of the end bush and the end 17 of the valve stem are all located diametrically within cylindrical volume defined by the annular recess 6. This shape and relative size of chamber combined with the external shape of the body 4 adjacent the annular recess 6 and the rubber hardness value i.e., 55° to 65° Shore A, enables the valve assembly to be fitted to the wheel rim by hand without the aid of a fitting tool. In addition the whole valve assembly is relatively more flexible than those hitherto used.

To manufacture the valve according to the invention the tubular stem 3 and end bush 19 components are injection moulded by well-known techniques and assembled together. This assembly is then placed in a suitable mould and the mushroom-shaped rubber body 4 is injection or transfer moulded thereon.

The fluted shape of the valve stem interior facilitates the use of an extractable pin which supports the valve stem during moulding of the rubber body. Moreover, the flutes allow the passage of air between the stem and the core during pressurization of the tire and the ribs between the flutes serve to locate the said core in assembled position.

Having now described my invention what I claim is:

1. An inflation valve comprising:
    a. a rubber body,
    b. a valve stem formed from moldable plastics material and of elongated form embedded in said rubber body,
    c. a plurality of depressions on the outer surface of the valve stem over a substantial portion of the length of said stem,
    d. a passage through said stem comprising a screw-threaded mouth portion at one end thereof and a valve seat formed inwardly of said mouth portion,
    e. an end bush at the end of said passage remote from said mouth portion, a lip formed by said end bush, a plurality of projections on the inner surface of said passage, said projections extending over the portion between said valve seat and said lip, and
    f. a valve core retained in said passage in sealing engagement with said valve seat by means of said screw-threaded mouth portion, the end of said valve core remote from the screw threads being in contact with said lip, said projections maintaining said valve core in spaced relationship from said inner surface to facilitate movement of filling air through said passage.

2. An inflation valve according to claim 1 wherein the projections comprise longitudinal ribs.

3. An inflation valve according to claim 1 wherein the end bush is formed from mouldable plastics material.

4. An inflation valve according to claim 1 formed by mouldable plastics material is nylon.

5. An inflation valve according to claim 4 wherein the mouldable plastics material which is reinforced with glass fibers.

6. An inflation valve according to claim 1 including a rubber body within which the valve stem is embedded.

7. An inflation valve according to claim 6 wherein an exterior annular recess is provided on the rubber body for engagement within a valve aperture provided in a wheel rim.

8. An inflation valve according to claim 7 wherein an interior chamber of circular cross-section is formed within the rubber body, a portion of said chamber having a relatively enlarged diameter into which portion the valve stem extends, and being located diametrically within the cylindrical volume defined by the exterior annular recess.

9. An inflation valve according to claim 6 wherein an interior chamber is formed within the rubber body, into which chamber the valve stem extends.

10. An inflation valve according to claim 6 wherein the rubber body has a rubber hardness value in the range 55° to 65° Shore A.

* * * * *